June 2, 1970 R. D. FRACASSI ET AL 3,515,805

DATA SCRAMBLER

Filed Feb. 6, 1967 2 Sheets-Sheet 1

INVENTORS R. D. FRACASSI J. E. SAVAGE

BY J. P. Kearns ATTORNEY

United States Patent Office 3,515,805
Patented June 2, 1970

3,515,805
DATA SCRAMBLER

Renato D. Fracassi, Middletown, and John E. Savage, Red Bank, N.J., assignors to Bell Telephone Laboratories, Incorporated, Murray Hill, N.J., a corporation of New York Filed Feb. 6, 1967, Ser. No. 614,226
Int. Cl. H04l 9/02
U.S. Cl. 178—22 9 Claims

ABSTRACT OF THE DISCLOSURE

Critical initial states in feedback-connected shift registers used as digital data scramblers can frustrate the attainment of intended pseudo-random line sequences of long period. Auxiliary apparatus in the form of additional shift register stages and counter-controlled monitoring logic for the basic scrambler forces short-period line sequences into the desired long pseudo-random period at all times.

FIELD OF THE INVENTION

Digital data scramblers of the type disclosed in the copending patent application of R. D. Fracassi and T. Tammaru, Ser. No. 482,498 filed Aug. 25, 1965, have utility in reducing the level of isolated tones generated when short-period repetitive data sequences are modulated up to the passband of band-limited transmission channels. The basic scrambler therein disclosed operated satisfactorily to remap dotting and all-one sequences into desired long-period sequences, but has been found not to scramble adequately other periodic sequences of length greater than period two but shorter than that of the desired pseudo-random sequence. These intermediate-length period sequences also tend to concentrate energy on the transmission line at certain frequencies. This invention guarantees that all source sequences of known period will be scrambled into periods of a minimal length which disperse line energy over the transmission band.

BACKGROUND OF THE INVENTION

A data scrambler may be defined as a digital machine which remaps data sequences having either long sequences without transitions or periodically recurring sequences of relatively short duration into substantially aperiodic channel sequences. Long channel sequences without transitions can result in loss of synchronism between a data transmitter and a data receiver linked by a given transmission channel. Short periodic sequences, on the other hand, result in the generation of high level tones in a transmitting channel. In common carrier telephone systems small nonlinearities are present in modulators and demodulators which are used to frequency multiplex a band of channels. Consequently, high level tones in one channel may produce in the mixing process crosstalk interference in other channels as a result of such nonlinearities. Limits on the levels of isolated tones are therefore generally established. Periodic data sequences in digital data transmission systems produce tones which can breach these limits.

There are thus two conflicting requirements. There must exist sufficient transitions in channel sequences to maintain satisfactory synchronization, but these transitions must be aperodic or substantially random to avoid harmful energy concentrations at particular frequencies on the transmission channel.

In the cited copending application a synchronous digital data signal is sequentially delayed. A key signal is then constructed from a modulo-two summation of a selected pair of past data bits. Finally, the key signal is further combined modulo-two fashion with the present data bit to form a channel signal which is quasi-random in nature. An inverse operation at the receiver recovers the key signal and subtracts it from the channel signal to reconstruct the original data sequence. The channel signal is presumptively free of tone-producing repetitive sequences and synchronization is recovered directly from the channel sequence.

According to the above scheme dotting sequences are properly randomized and transitionless sequences are broken up, by monitoring for their presence. It has now been discovered that there exists critical initial states of the scrambler which fail to remap repetitive sequences other than dotting and transitionless sequences into new periodic sequences of longer period. These longer repetitive sequences can also generate deleterious tone levels in the transmitting channel. Such sequences are not adequately randomized by the scrambler of the cited patent application and may in fact simulate seven- and eight-bit control sequences found in the recently adopted American Standard Code for Information Interchange (ASCII) and other data processing codes. Repetitive occurrence in message data transmission of sequences of these lengths can cause undesirable tone levels in transmission channels. Among these sequences are those for null (0000-0001), sync (00101100), delete (11111110), idle (1111-100) and space (0000001).

It is therefore an object of this invention to map periodic data sequences of known length into quasi-random periodic channel sequences of much longer periods. These quasi-random periodic sequences at one and the same time will provide transitions for the channel sequence sufficient in number for self-synchronization and random enough in dispersion for avoidance of channel energy concentration.

It is another object of this invention to provide general design criteria for the construction of scramblers and descramblers for periodic data sequences of arbitrary length.

It is a further object of this invention to guarantee that no channel sequence shorter than some minimum length will be generated regardless of the input data sequence. Such minimum length may be of the order of one hundred or more.

SUMMARY OF THE INVENTION

According to this invention, self-synchronizing digital data scramblers comprise a basic scrambler of the type disclosed in the cited copending patent application and monitoring logic for detecting the presence of periodic channel sequences of known length and for remapping such detected sequences into new sequences many times the length of the original sequence. The herein-designated basic scrambler comprises a linear sequential filter with feedback paths from selected taps thereon to the input. The corresponding basic descrambler comprises a linear sequential filter with feed-forward paths from similarly selected taps thereon to the outputs.

The number of stages of delay in the basic scrambler or descrambler is shown to be a joint function of the shortest allowable channel sequence and of the shortest expected input data sequence. The general solution to the problem of tap selection is discussed herein.

According to one aspect of this invention, the number of stages of delay in the sequence filter of the basic scrambler and descrambler is chosen or extended to equal in number the period of the longest data sequence with deleterious tone-producing properties. The input data bit and the delayed data bits, spaced along the sequential filter by the lengths of several such deleterious sequence periods, are compared and control outputs are generated whenever there is a match. A single synchronously advanced counter is allowed to reach a predetermined threshold in the presence of a sustained matching control signal. Upon reaching threshold the prevailing data bit is complemented to prevent an undesired input sequence from appearing on the channel. The counter is reset when it reaches threshold as well as in the absence of a matching control signal.

According to another aspect of the invention, the number of stages of delay in the sequential filter is also extended, as necessary, beyond the range of the basic scrambler and descrambler to the length of the longest periodic data sequence it is desired to break up. Comparison circuits, including zero-level slicers, are established between the input to the basic scrambler and taps on the extended scramber corresponding to the length of each undesired periodic sequence. An individual monitoring counter with preassigned threshold is then provided for each comparator circuit. The counter outputs are further buffered to complement the prevailing data bit whenever any of the counters reaches threshold. At the same time all counters are reset.

The corresponding descrambler in either case is the complement of the transmitting scrambler with feedforward paths rather than feedback paths.

Whereas the length of the basic scrambler is determined in the binary case by the shortest random channel sequence allowable, the length of the extended scrambler is determined by the length of the longest undesired sequence. However, it will be understood that where the basic scrambler is as long as, or longer than, the undesired sequence the monitoring tap may be included within the length of the basic scrambler. An advantage of this invention is that the level of tones produced by the unscrambled sequence is reduced by a factor equal to the ratio of the length of the unscrambled periodic sequence to that of the scrambled sequence. The scrambled sequence will also have as many low-level tones as the number of high-level tones in the unscrambled sequence multiplied by the reciprocal of this same factor.

Another advantage of this invention is that the scrambled sequence will have half as many transitions for synchronization purposes as there are digits in the sequence.

A feature of this invention is that scramblers and descramblers constructed according to the principles of this invention are capable of implementation by well-known logic circuits.

DESCRIPTION OF DRAWING

Additional objects, features and advantages of this invention will be appreciated from a consideration of the following detailed description and the drawing in which.

DETAILED DESCRIPTION

Figure 1:
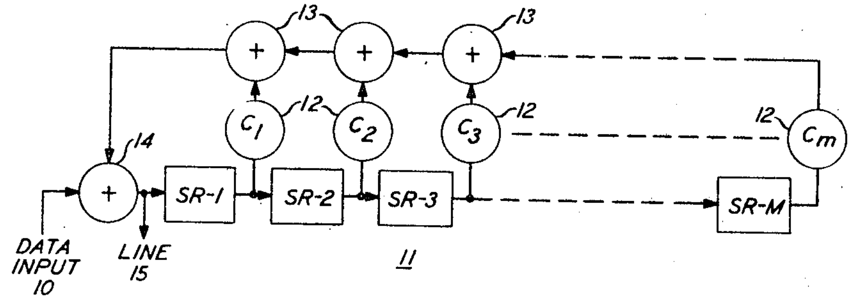
FIG. 1 PRIOR ART
FIG. 1 is a block diagram of the basic data scrambler disclosed in the cited copending patent application.

FIG. 1 depicts the basic scrambler disclosed in the above-mentioned copending patent application. The basic scrambler is a linear sequential filter with a plurality of feedback paths between selected time-spaced taps thereon and its input. Its output is the modulo-$p$ sum of the input data and the feedback components, where $p$ is the number of elements in the input data alphabet, if such number is a prime number and the succeeding prime number otherwise. In the usual binary case, $p=2$.

The filter comprises a plurality $m$ of stages of delay represented here by a shift register 11 with stages SR–1 through SR–M, a plurality of multipliers 12 with factors $c_1$ through $c_m$ at taps on register 11, and a plurality of modulo-$p$ adders 13 connected in tandem between multipliers 12 and an input adder 14. Adder 14 has as its input data signals from line 10 and as its output a transmission line 15 and the first stage of the linear sequential filter.

The basic scrambler of FIG. 1 has now been analyzed in terms of the number of elements $p$ in the data source alphabet, the number of storage elements $m$, and the tap constants $c_i$ ($i=1, 2, 3, \ldots m$). A tap polynomial $h(x)$ may be written as $$h(x)=x^m-c_1x^{m-1}- \ldots -c_m \quad (1)$$

In Equation 1 the powers of $x$ identify the taps from the input to stage SR–1 to the output of stage SR–M. At the input tap the multiplier is unity (coefficient of the term $x^m$). At all other taps the $c_m$ coefficients are chosen to make the polynomial in Equation 1 primitive, over the field of $p$ elements, where $p$ is the length of the data source alphabet if a prime number and the succeeding prime number otherwise. If the data alphabet is binary—contains only zero and one—the number of elements is 2 and is prime. Thus, $p=2$. Similarly, for a ternary alphabet, $p=3$. However, for a quaternary alphabet, $p=5$. A polynomial is primitive if it is irreducible, i.e., has no factors but itself and one, and divides $x^n-1$ for $n=p^m-1$, but for no smaller $n$. Tables of irreducible primitive polynomial coefficients have been constructed or can be generated by computer techniques.

Reference is made in this connection to Appendix C of W. W. Peterson's "Error Correcting Codes" M.I.T. Press and John Wiley & Sons, Incorporated, New York, 1961, for irreducible primitive polynomials in the binary field.

The degree $m$ of the polynomial is determined from the following theorem:

A linear sequential filter when excited by a sequence of period $s$ will respond with a periodic line sequence whose period is either $s$ or the least common multiple of $s$ and $p^m-1$. The period $s$ line sequence can occur only when the initial state of the storage elements is critical, and as part of the theorem, we also say there exists only one such critical state.

An example of a critical initial state is illustrated when the data source is binary in the following Table I. A five-stage basic scrambler with feedback from the third and fifth stages toward the input is assumed and a periodic seven-bit data sequence of the form 1001000. The critical state has been determined to be 11001.

TABLE I

| Data | Key, SR-3+ SR-5 | Critical state SR-1 | SR-2 | SR-3 | SR-4 | SR-5 |
|---|---|---|---|---|---|---|
| 1 | 1 | 1 | 1 | 0 | 0 | 1 |
| 0 | 1 | 0 | 1 | 1 | 0 | 0 |
| 0 | 1 | 1 | 0 | 1 | 1 | 0 |
| 1 | 1 | 1 | 1 | 0 | 1 | 1 |
| 0 | 0 | 0 | 1 | 1 | 0 | 1 |
| 0 | 1 | 0 | 0 | 1 | 1 | 0 |
| 0 | 1 | 1 | 0 | 0 | 1 | 1 |
| 1 | | 1 | 1 | 0 | 0 | 1 |

The key signal of column 2 is the modulo-two sum of the bits stored in stages SR–3 and SR–5 of the same row. For all rows after the top the bit in stage SR–1 is the modulo-two sum of the data and key bits of the first and second columns of the row next above. The bits in the remaining stages SR–2 through SR–5 of a given row are those shifted one column to the right from stages SR–1 through SR–4 of the row next above.

The critical state of the top row is seen to be regenerated in the bottom row below the horizontal line and thus the output of the system will remain periodic with a period of seven. The line signal constitutes the bits successively stored in stage SR–1 reading from the top of the column down. Thus, the seven-bit periodic data signal 1001000 is translated into another seven-bit periodic line signal 1011001 and is not scrambled when the initial state of the scrambler is 11001.

For every periodic input there exists one critical state which will transform, but not scramble, that input into an output of the same period. For any other initial state the input will be scrambled into an output with a period which is the least common multiple of the period $s$ of the input sequence and $p^m-1$, where $m$ is the number of scrambler stages.

Once the shortest permissible line sequence is stated, the length $m$ of the scrambler is selected to make the least common multiple of $p^m-1$ and the period $s$ of the periodic input of smallest period larger than that shortest permissible length. For a binary field ($p=2$) and a transitionless input (which has period 1) a five-stage scrambler yields a sequence of period $2^5-1=31$ and a seven-stage scrambler yields a sequence of period $2^7-1=127$. According to Peterson, there are eighteen choices of coefficients which will render a seventh-degree polynomial $h(x)$ primitive and irreducible. A choice with the minimum number of nonzero coefficients yields $$h(x)=x^7+x^3+1 \qquad (2)$$

Equation 2 defines a scrambler like that of FIG. 1 with seven stages SR–1 through SR–7, a modulo-two adder in position 14 and a modulo-two adder 13 having inputs from taps at the outputs of stages SR–4 and SR–7 through multipliers of unity gain at $c_4$ and $c_7$ and an output connected to adder 14.

The corresponding descrambler is the mirror image of the scrambler with feed-forward rather than feedback paths. The descrambler is self-synchronous as long as no line errors occur.

Figure 2:
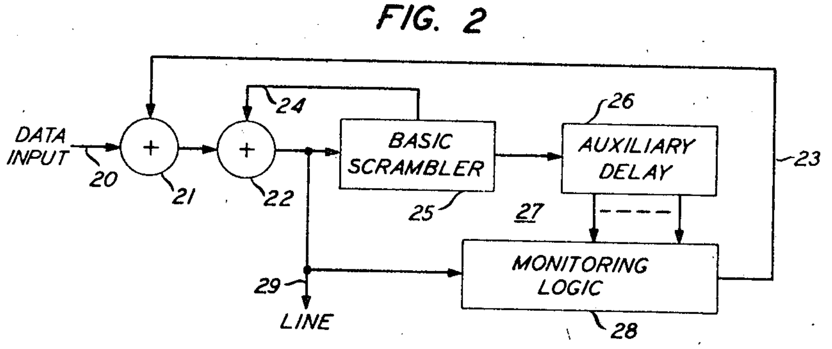
FIG. 2 is a generalized block diagram of the improved data scrambler according to this invention.

FIG. 2 is a simplified block diagram of the improved scrambler according to this invention. To the basic scrambler 25, analogous to elements 11, 12, and 13 of FIG. 1, are added auxiliary delay unit 26 and monitoring logic 28. Basic scrambler 25 operates as previously described to complement the input data on line 20 in modulo-two adder 22 over control line 24. If the undesirable data input period is longer than the number of stages provided in the basic scrambler, additional stages of storage or delay are furnished in auxiliary delay unit 26 at the output of basic scrambler 25. There is no direct feedback from auxiliary delay 26 to the data input sequence. However, output leads 27 from delay 26 are spaced from the input to scrambler 25 by the respective lengths of undesired sequences to be monitored. Monitoring logic 28 compares the outputs on leads 27 with the input to basic scrambler 25 and if they continuously match, complements the input data bit over lead 23 at modulo-two adder 21. The undesired sequence is thereby broken up and the output of the system on line 29 is forced to be of relatively long period. The improved descrambler is the same as the scrambler of FIG. 2 with data input 20 and output line 29 interchanged. The arrowheads at points 20, 29 and between adders 21 and 22 are necessarily reversed.

Two basic types of self-synchronizing, digital data scramblers have been devised. They are the single-counter and multicounter types. The block diagram of FIG. 2 is regarded as generic to both types.

Figure 3:
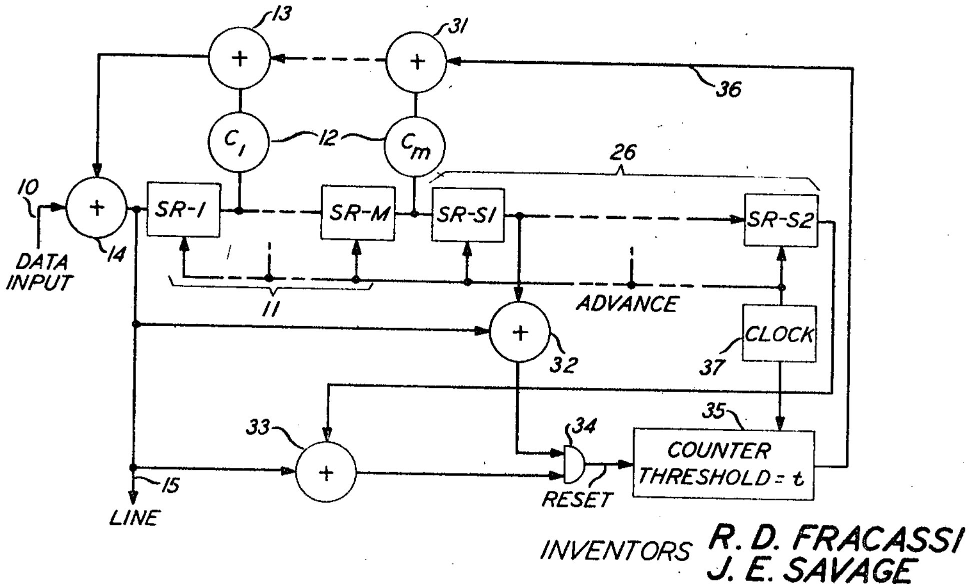
FIG. 3 is a block diagram of a single-counter data scrambler according to this invention.

The block diagram of FIG. 3 depicts the single-counter scrambler according to this invention. Here shift register stages SR–1 to SR–M, generally designated 11, adders 13 and 14 and multipliers $c_1$ through $c_m$ constitute together the basic scrambler as in FIG. 1. Auxiliary shift register stages SR–S1 to SR–S2, generally designated 26, constitute the auxiliary delay 26 of FIG. 2. Assume that there are periodic sequences of length S1 and S2, each greater than $m$, the number of stages in the basic scrambler. Then the output of stage SR–S1 is delayed by S1 bit intervals from the input to stage SR–1. Similarly, the output of stage SR–S2 is delayed S2 bit intervals from the input to stage SR–1. Monitoring logic comprises single-counter 35 with a threshold reached after $t$ counts, modulo-two adder 32 for comparing the output of stage SR–S1 with the input to stage SR–1, modulo-two adder 33 for comparing the output of stage SR–S2 with the input to stage SR–1, AND-gate 34 for combining the significant nonzero outputs of adders 32 and 33 to reset counter 35. Adders 32 and 33 have nonsignificant or zero outputs when their respective inputs are identical, i.e., when a periodic sequence of length S1 or S2 is present on the data input. In this case there will be no resetting output and counter 35 will advance toward its threshold. On the other hand, if neither periodic sequence of length S1 or S2 is present, both adders 32 and 33 will have nonzero outputs which when combined in gate 34 will reset counter 35. Clock 37 provides an output at the data bit rate to advance all shift register stages simultaneously and also counter 35 in the absence of a resetting input.

Upon reaching threshold $t$, either sequence S1 or S2 being on the data input line, counter 35 produces a significant nonzero output on line 36 which is added in modulo-two adder 31 to the feedback path of the basic scrambler. The present data input bit is thus complemented and the output of the system on line 15 does not include any sequence of period S1 or S2.

It should be noted that a period S1 or S2 includes lesser periods which divide it. A period $S2=8$, for example, includes periods of lengths 2 and 4. Also S1 and S2 must be relatively prime to each other and to the period $2^m-1$ of the basic scrambler. The minimum threshold $t$ for counter 35 has not been determined, but it is known that it need not be longer than $$S2(2^m-1)-2^{m-1}+2$$

where $m$ and S2 have been previously defined. For $m=7$, $S1=7$ and $S2=8$, $t=954$ maximum. A seven-stage binary counter with threshold $t=28$ has been found suitable in a practical case without providing unnecessary complementing of the input. Lesser threshold counts may react unfavorably to strictly random data or noise.

Figures 4, 5:
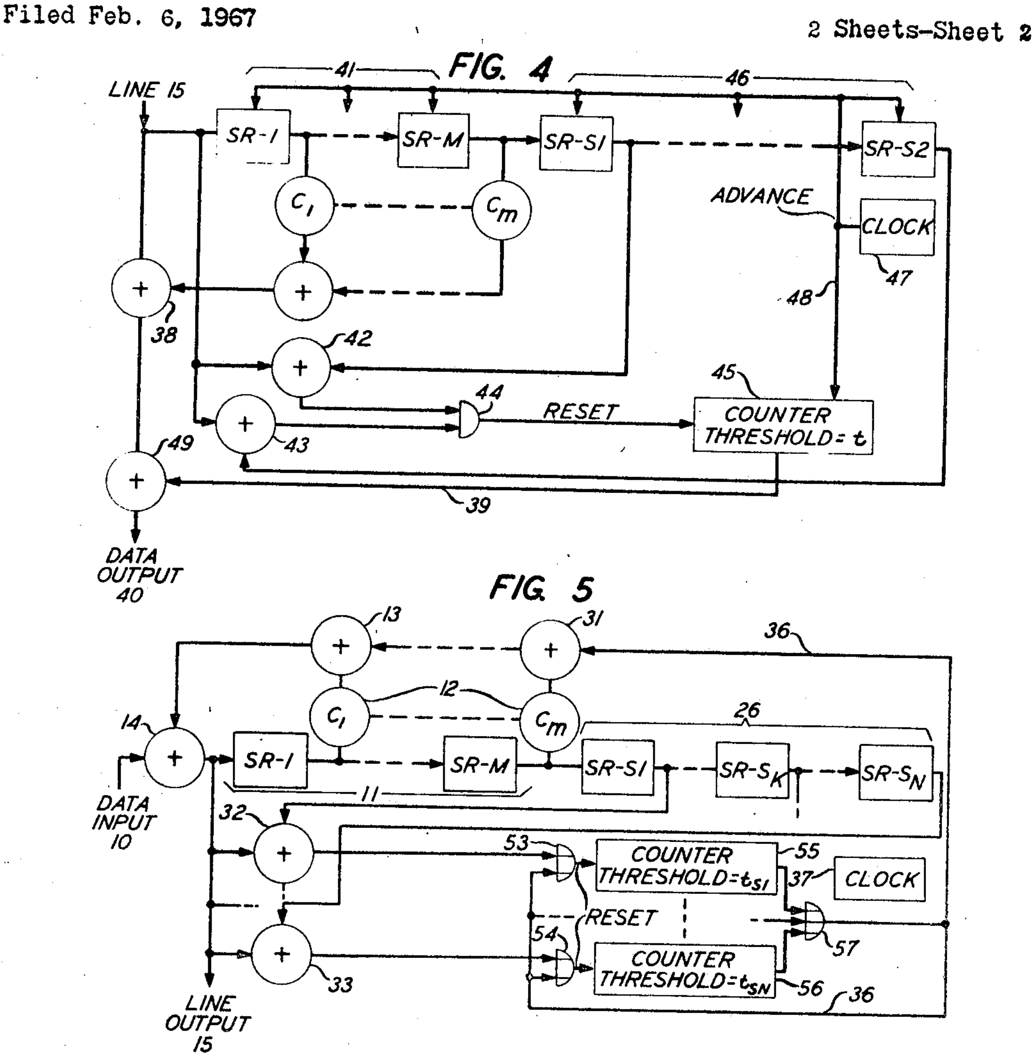
FIG. 4 is a block diagram of a single-counter data descrambler according to this invention.
FIG. 5 is a block diagram of a multicounter data scrambler according to this invention.

FIG. 4 illustrates in block diagram form the single-counter descrambler corresponding to the single-counter scrambler of FIG. 3. The single-counter descrambler comprises a basic descrambler 41, auxiliary delay 46, and monitoring logic including adders 42 and 43, AND-gate 44 and counter 45 with a threshold $t$. The basic descrambler has shift register stages SR–1 through SR–M, where M is the same as in the corresponding scrambler; multipliers $c_1$ through $c_m$, and modulo-two adders as shown. With coefficients $c_1$ through $c_m$ chosen according to the same primitive polynomial $h(x)$ as those in the sending scrambler, it is apparent that the same sequence will be reconstructed at the input of adder 49 as formerly existed at the input to the sending scrambler once the initial state of stages SR–1 through SR–M are purged. Adder 42 has as inputs the received line sequence and the output of auxiliary stage SR–S1 and therefore has a zero output whenever the present data bit and that S1 bits ago are the same. Similarly, adder 43 has a zero output whenever the line input and the bit S2 data intervals ago match. Since both adders 42 and 43 drive AND-gate 44 a resetting output indicates that sequences of periods divisible into S1 or S2 are absent from the line input. Counter 45 can reach threshold $t$ only when data bits spaced by either S1 or S2 match for $t$ data bit intervals. When $t$ counts are made, the line sequence is complemented by adder 49 over lead 39.

Clock 47, which may be synchronized by transitions in the line sequence in any convenient manner, controls the shifting of registers 41 and 46 and the counting interval of counter 45. The descrambler of FIG. 4 is seen to be substantially the mirror image of the scrambler of FIG. 3.

The single-counter scrambler can be expanded to monitor more than two periodic sequences in an obvious manner.

Figure 6:
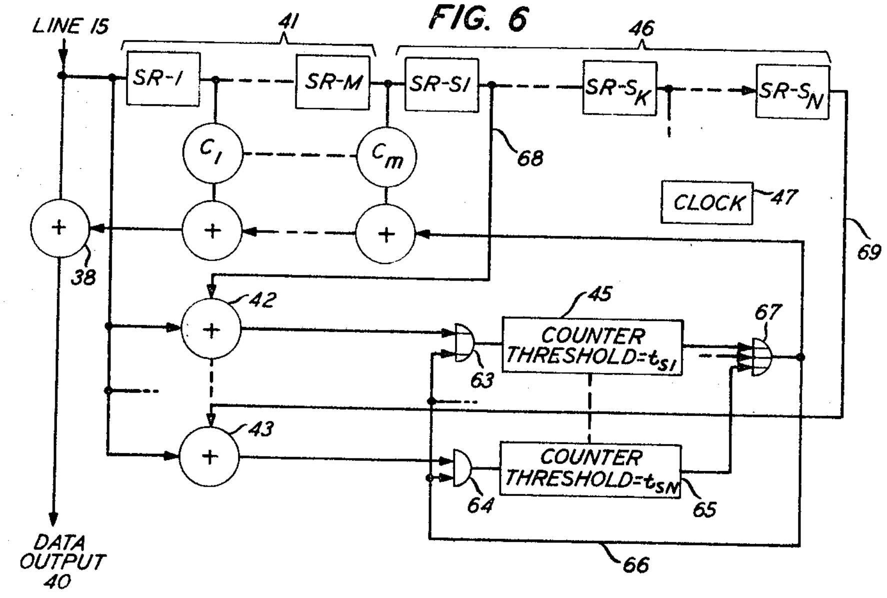
FIG. 6 is a block diagram of a multicounter data descrambler according to this invention.

Since the single-counter scrambler operates in a way which makes it inconvenient to determine which periodic sequence is present, another embodiment called the multicounter scrambler has been devised to monitor periodic sequences independently. FIGS. 5 and 6 are block diagrams of complementary multicounter scramblers and descramblers.

The multicounter scrambler of FIG. 5 is similar to the single-counter scrambler of FIG. 3 in having a basic scrambler register 11 and an auxiliary register 26. One additional stage SR–$S_k$ is included in auxiliary delay 26 to indicate that any number of individual length sequences can be monitored. For each periodic sequence to be monitored a counter 55 or 56 is provided. The input to each counter is the difference between the present data digit and the digit transmitted $S_i$ ($i$=1, 2, . . . , N) clock intervals earlier as obtained in modula-two adders 32 or 33. (In modulo-two arithmetic addition and subtraction are equivalent.) Adder 32, for example, takes the difference between the digit at the input to stage SR–1 and the output of auxiliary stage SR–S1. These two points are S1 data intervals apart. If the data sequence has the period S1, these two digits agree and the difference is zero. Then the associated counter will reach threshold $t_{S1}$. Clock 37, synchronized with the data input, determines the counting rate in any convenient manner. The counter output, applied through OR-gate 57 and lead 36 will complement the sum of the tap outputs from the basic scrambler through adder 31. At the same time all counters are reset over the lower branch of lead 36 and OR-gates, such as those designated 53 and 54.

If the respective digits separated by any selected interval $S_1$, $S_k$, or $S_N$ fail to agree, then a significant nonzero output appears at the associated adder, such as 32 or 33, and resets the appropriate counter 55 or 56 through OR-gate 53 or 54. Counter thresholds for each counter are selected to have a minimum value equal to one less than the number of stages $m$ in the basic scrambler plus the length of the longest sequence being monitored by any other counter, i.e., $$t_{S_i}=(m-1)+s_j\ (\max)\ (i\neq j) \qquad (3)$$

If only one period is being monitored, only one counter is employed and the threshold of this counter is chosen to have a minimum value of $m$.

The actual value of the threshold may advantageously be the next higher full count of a multistage binary counter. For example, if 7- and 8-bit periodic sequences are being monitored by a five-stage basic scrambler, then Equation 3 requires a minimum counter threshold of 12 for the counter monitoring the period 7 sequence. The next higher binary counter with four stages yields a full count of 16. A higher count than the minimum has the advantage of changing the tap sum only when necessary. Random data may sometimes generate line sequences which appear to be periodic.

The descrambler corresponding to the multicounter scrambler of FIG. 5 is shown in FIG. 6. The scrambled line sequence at input 15 is sequentially delayed in basic descrambler stages 41 and further delayed in auxiliary stages 46 for monitoring for sequences of selected length, such as $S_1$, $S_k$, and $S_N$, among others. Since register stages 41 and 46 have inputs identical to stages 11 and 26 in the scrambler of FIG. 5, the same tap correction factors will be generated. Adders, such as 42 and 43, will monitor sequences of lengths $S_1$ and $S_N$ over leads 68 and 69 and produce outputs accordingly to permit counters 45 and 65 to reset or to count to thresholds $t_{S1}$ and $t_{SN}$. When either counter 45 or 65 reaches threshold, all counters will be reset over lead 66 and OR-gates 63 and 64 and the tap sum will be complemented in adder 38 to reconstruct the original transmitted data. Clock 47, synchronized with received transitions in a conventional way, provides advance pulses for shift register stages SR–1 through SR–SN and control the counts of counters 45 and 65. Since the scrambler and descrambler are reacting to the same line sequences, the key signal generated at the scrambler will be regenerated at the descrambler. The only discrepancies likely to occur are those due to errors on the line or differing initial states. Either of these conditions will be self-correcting within the span of the shift registers.

It is also possible to monitor periodic line sequences by combining a single-counter monitor to detect either of two periodic sequences $S_1$ or $S_2$ and a multicounter monitor to detect additional periodic sequences $S_3$ to $S_N$. The outputs of all counters can be combined in a single OR-gate which in turn is added modulo-two to the tap sum. The OR-gate output also resets all counters.

In theory the multicounter scrambler-descrambler will function to remap nonbinary or multilevel periodic sequence if multilevel storage elements, multilevel multipliers and adders become readily available. In this case modulo-$p$ addition and multiplication must be effected. The letter $p$ designates the prime number just larger or equal to the number of permissible code levels. In the alternative it is conceivable that multilevel signals can be converted to binary coded forms before scrambling and descrambling according to this invention.

Inasmuch as the remapping of specially monitored periodic sequences into very long pseudo-random sequences is due to the insertion of complementing pulses at rather infrequent intervals, the monitoring logic in the descrambler may in many cases be eliminated if infrequent errors can be tolerated. The objective of removing certain periodic sequences from the line will have been accomplished. In this case the descrambler will comprise the basic descrambler only.

While this invention has been described in terms of particular illustrative embodiments, many other modifications will occur to those skilled in the art without departing from the spirit and scope of the appended claims.

What is claimed is:

1. In combination with a scrambler for transforming digital data having periodic sequences of two elements or less into long-period pseudo-random line sequences, means further scrambling line sequences of arbitrary period longer than two elements comprising means sequentially storing line sequences of said arbitrary period, means responsive to the difference between line elements applied to and emitted by said storing means monitoring periodicity in said line sequences, and means complementing the next line element upon detection of said line sequence by said monitoring means.

2. The combination of claim 1 in which a plurality of line sequences of arbitrary length are further scrambled, said storing means is as long as the longest line sequence to be scrambled, and said monitoring means collectively detects the presence of any of said line sequences.

3. The combination of claim 1 in which a plurality of line sequences of arbitrary length are further scrambled, said storing means is as long as the longest line sequence to be scrambled, and said monitoring means separately detects the presence of each of said plurality of line sequences.

4. In combination with a multistage scrambler for digital data in which outputs of selected stages are fed back to the input thereof to transform periodic sequences two elements or less in length into long-period pseudorandom line sequences, means scrambling periodic selected line sequences longer than two elements in length comprising means comparing the present data element at the input of said scrambler with the line element generated each selected period earlier, means responsive to said comparing means counting the number of successive matches in said line sequence, said counting means having a predetermined threshold count, and means responsive to said threshold count complementing the next occurring line element and resetting said counting means.

5. The combination of claim 4 in which a single-counting means is responsive to the occurrence of any or all selected periodic sequences.

6. The combination of claim 4 in which individual counting means with individually chosen threshold counts are assigned to monitor each selected periodic sequence.

7. The combination of claim 4 in which some selected periodic sequences are monitored by a single counting means with more than one alternative input and other periodic sequences are monitored by individual counters and all counters are reset whenever any counter reaches its preassigned threshold.

8. Self-synchronizing apparatus for randomizing a data signal pattern with periodic sequences of arbitrary length comprising a first storage memory having at least as many cells as the length of the longest periodic sequence, means for constructing a key signal from a modulo-$p$ summation of digits stored in selected cells of said first memory, said cells being selected according to the coefficients of a primitive polynomial of degree $m$, $m$ being the highest order cell from which said key signal is to be constructed and being chosen such that $p^m-1$ (where $p$ is the prime number equal to or next succeeding the number of signal elements in the data signal alphabet) equals or exceeds a predetermined minimum length periodic scrambled sequence, means for combining said key signal with said data signal to form a scrambled line signal and the input to said first storage means, means monitoring periodicity in said line sequence of said arbitrary lengths by comparing the present line sequence signal element with elements stored in said first memory said arbitrary number of intervals earlier, means for altering the state of the present line element when said monitoring means has detected such periodicity, a transmission channel for said scrambled line sequence, a second storage memory at the remote end of said channel having the same number of cells as said first storage memory, means connected to said second memory reconstructing the same key signal as generated by said constructing means, and means recombining said reconstructed key signal with scrambled line sequence to recover said data signal.

9. Self-synchronizing apparatus according to claim 8 in which further means monitoring periodicity in said scrambled line sequence is connected at the remote end of said channel to said second storage memory, and further means altering the state of the present line element when said further monitoring means has detected such periodicity.

References Cited

UNITED STATES PATENTS 3,155,818 11/1964 Goetz ------------ 340—146.1

RICHARD A. FARLEY, Primary Examiner

C. E. WANDS, Assistant Examiner